(12) United States Patent
Iwanaga et al.

(10) Patent No.: US 9,973,947 B2
(45) Date of Patent: May 15, 2018

(54) WIRELESS COMMUNICATION DEVICE AND WIRELESS COMMUNICATION SYSTEM THAT PERFORMS WIRELESS COMMUNICATION WITH A COUNTERPART DEVICE USING A DIRECTIONAL ANTENNA

(71) Applicant: Hitachi Kokusai Electric Inc., Tokyo (JP)

(72) Inventors: Kazunari Iwanaga, Tokyo (JP); Shinya Kobayashi, Tokyo (JP); Naoyasu Sasanami, Tokyo (JP)

(73) Assignee: HITACHI KOKUSAI ELECTRIC, INC., Tokyo (JP)

( * ) Notice: Subject to any disclaimer, the term of this patent is extended or adjusted under 35 U.S.C. 154(b) by 0 days. days.

(21) Appl. No.: 15/362,235

(22) Filed: Nov. 28, 2016

(65) Prior Publication Data

US 2017/0078901 A1 Mar. 16, 2017

Related U.S. Application Data

(63) Continuation-in-part of application No. PCT/JP2015/065581, filed on May 29, 2015.

(30) Foreign Application Priority Data

May 30, 2014 (JP) .................................. 2014-112070

(51) Int. Cl.
*H04L 12/28* (2006.01)
*H04W 24/04* (2009.01)
(Continued)

(52) U.S. Cl.
CPC ............... *H04W 24/04* (2013.01); *G06T 7/11* (2017.01); *H04N 7/18* (2013.01); *H04N 7/183* (2013.01); *H04W 24/08* (2013.01); *H04W 84/14* (2013.01)

(58) Field of Classification Search
USPC ......................................... 370/241, 329, 386
See application file for complete search history.

(56) References Cited

U.S. PATENT DOCUMENTS

2006/0180371 A1* 8/2006 Breed .................... G07C 5/008
180/197
2013/0247117 A1* 9/2013 Yamada ................. G08C 17/02
725/93

FOREIGN PATENT DOCUMENTS

JP 2002-99909 A 4/2002
JP 2009-211525 A 9/2009
(Continued)

OTHER PUBLICATIONS

International Written Opinion from International Application No. PCT/JP2015/065581 dated Aug. 25, 2015.
(Continued)

*Primary Examiner* — John Pezzlo
(74) *Attorney, Agent, or Firm* — Brundidge & Stanger, P.C.

(57) ABSTRACT

A wireless device includes an imaging unit having an optical axis which is identical to a radio wave direction of a directional antenna, a reference image is stored in a storage unit, a wireless communication device serving as a communication counterpart and an area around the wireless communication device are photographed at regular intervals, and a control unit compares images photographed at regular intervals with a reference image, calculates a degree of similarity through normalized cross-correlation which is hardly influenced by a change in brightness, calculates an index value indicating a state of a region serving as a monitoring target based on a degree of weighted similarity, detects an abnormality when the index value is a specific numerical value or less, and outputs alert information
(Continued)

including the photographed image when a state in which the abnormality is detected is continued for a certain period of time.

6 Claims, 11 Drawing Sheets

(51) Int. Cl.
*H04N 7/18* (2006.01)
*H04W 24/08* (2009.01)
*H04W 84/14* (2009.01)
*G06T 7/11* (2017.01)
*H04J 1/16* (2006.01)

(56) References Cited

FOREIGN PATENT DOCUMENTS

| JP | 2011-35663 A | 2/2011 |
| JP | 2013-214859 A | 10/2013 |
| WO | 2013125265 A1 | 8/2013 |

OTHER PUBLICATIONS

KMW Communications, "Eyeontenna—Imbedded Network Camera onto DualPhase™ Antenna", Aug. 20, 2010, 1 page.
International Search report from International Application No. PCT/2015/065581 dated Aug. 25, 2015, 2 pages.

* cited by examiner

| REGION | SIMILARITY | AVERAGE | STANDARD DEVIATION | THRESHOLD VALUE | NORMALIZED CORRECTION | REGION WEIGHT | RELIABILITY | WEIGHTED INTEGRATED SIMILARITY | NORMAL/ ABNORMAL | SCORE |
|---|---|---|---|---|---|---|---|---|---|---|
| MONITORING REGION 70 | 0.95 | 0.89 | 0.05 | 0.79 | 1.0 | 0.5 | 1.0 | | | |
| 8(1,1) | 0.94 | 0.88 | 0.06 | 0.73 | 1.0 | 0.1 | 0.95 | | | |
| 8(1,2) | 0.92 | 0.91 | 0.04 | 0.80 | 1.0 | 0.1 | 0.95 | | | |
| 8(1,3) | 0.99 | 0.94 | 0.07 | 0.80 | 1.0 | 0.1 | 0.93 | | | |
| 8(2,1) | 0.72 | 0.82 | 0.10 | 0.62 | 1.1 | 0.075 | 0.65 | | | |
| ... | ... | ... | ... | ... | ... | ... | ... | | | |
| 8(4,3) | 0.41 | 0.50 | 0.01 | 0.49 | 1.3 | 0.025 | 0.00 | | | |

FIG. 13

| TENDENCY \ CAUSE | NEW BUILDING | DEVICE DEVIATION | CAMERA FAILURE/ CONTAMINATION |
|---|---|---|---|
| DEGREE OF SIMILARITY DECREASES IN ORDER FROM DIVISIONAL BLOCK AT BOTTOM | ○ | × | △ |
| DEGREE OF SIMILARITY DECREASES IN ORDER FROM DIVISIONAL BLOCK AT TOP | × | × | ○ |
| COUNTERPART COMMUNICATION DEVICE IS DETERMINED TO BE ABNORMAL | ○ | × | × |
| COUNTERPART COMMUNICATION DEVICE IS DETERMINED TO BE NORMAL | △ | ○ | ○ |
| RADIO WAVE STRENGTH DECREASES TOGETHER | ○ | ○ | × |
| ⋮ | ⋮ | ⋮ | ⋮ |

FIG. 14

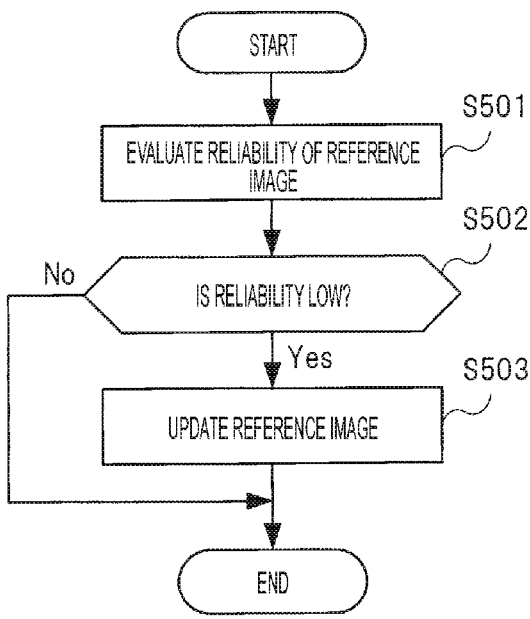

WIRELESS COMMUNICATION DEVICE AND WIRELESS COMMUNICATION SYSTEM THAT PERFORMS WIRELESS COMMUNICATION WITH A COUNTERPART DEVICE USING A DIRECTIONAL ANTENNA

BACKGROUND

Technical Field

The present invention relates to a wireless communication device and a wireless communication system using a directional antenna, and more particularly, a wireless communication device and a wireless communication system, which are capable of reducing a maintenance load, predicting the occurrence of a communication failure with a high degree of accuracy, and thus improving reliability of communication.

Related Art

In the past, as a fixed wireless access (FWA) wireless communication system having quasi-millimeter to millimeter wavebands, there is a system in which point-to-point (P2P) wireless communication is performed between specific fixed communication devices using an antenna having sharp directivity. Antennas of communication devices constituting a pair are installed to face each other.

In this wireless communication system, when deviation in an antenna direction occurs or a building is newly installed between two points, a wireless signal is "unlikely" to arrive linearly (with no reflection), and there is a risk that a communication failure will occur. If it is possible to detect a possibility of a communication failure in advance, a countermeasure of relocating a base station can be taken, and thus a technique of predicting the occurrence of a communication failure through image analysis has been developed.

For example, a technique in which an imaging device that photographs a counterpart communication device is installed in a communication device, and a user sequentially checks photographed images and detects an abnormality or a technique of calculating a luminance difference in a direction between frames of an image and activating an alert when a luminance difference is large has been developed.

However, it is very complicated and large in a work load for a maintenance person to check all photographed images, and in the alert activation based on a comparison of a luminance difference, it responds even to events which are not related to a communication failure such as the weather or a sunshine condition, and an alert is often erroneously activated.

The technique of predicting the occurrence of a communication failure based on an image is disclosed, for example, WO/2013/125265, entitled "Radio Communication Apparatus, Radio communication method, and Radio Communication System" (Hitachi Kokusai Electric Inc.). In the technique disclosed in WO/2013/125265, an imaging unit whose optical axis is oriented in the same direction as a main lobe direction of a directional antenna is arranged, a reference image indicating the likelihood for an opposite wireless communication device is photographed and stored as reference image data, photographed image data photographed at regular intervals is compared with the reference image data to detect whether or not an obstacle is oriented in a radio wave direction, and a notification of a detection result is given.

SUMMARY

As described above, in the wireless communication device and the wireless communication system according to the related art, when the occurrence of a communication failure is predicted by visual checking, a work of a maintenance person who checks an image is complicated, a load is increased, and when it is determined based on a luminance difference of an image, there is a problem in that an alert is often erroneously activated, for example, due to difference in the weather or the sunshine condition.

However, a technique of calculating a degree of similarity between a reference image and divisional blocks obtained by dividing a divisional monitoring region obtained by expanding a monitoring region including a monitoring target, integrating the degrees of similarity of the monitoring region and the divisional blocks, determining normality/abnormality of a current state, and transmitting alert information when an abnormality is continued for a certain period of time or estimating a cause of abnormality in view of a temporal change tendency of a degree of similarity is not disclosed in WO/2013/125265.

The present invention was made in light of the foregoing, and it is an object of the present invention to provide a wireless communication device and a wireless communication system, which are capable of reducing a maintenance load, predicting the occurrence of a communication failure with a high degree of accuracy, and thus improving reliability of communication.

According to an aspect of the present invention, provided is a wireless communication device that performs wireless communication with a counterpart device using a directional antenna, and includes an imaging unit that has an optical axis which is identical to a radiation axis of the directional antenna, and photographs an image of a region including the counterpart device serving as a monitoring target, a storage unit that stores a reference image serving as a reference which is photographed by the imaging unit, and a control unit that performs a communication failure prediction process of acquiring a photographed image photographed by the imaging unit at regular intervals, calculating a degree of similarity between the photographed image and the reference image for the region serving as the monitoring target through normalized cross-correlation, calculating an index value of the region serving as the monitoring target based on the degree of similarity which is weighted, detecting an abnormality when the index value is a specific numerical value or less, and outputting alert information including the photographed image when a state in which the abnormality is detected is continued for a certain period of time.

Further, according to another aspect of the present invention, in the wireless communication device, the control unit sets a monitoring region including the counterpart device and a plurality of divisional blocks obtained by dividing an extended region obtained by extending the monitoring region as the region serving as the monitoring target, and in the communication failure prediction process, the control units calculates the degree of similarity between the photographed image and the reference image for the monitoring region and the divisional blocks, calculates an integrated index value in which the degrees of similarity of the monitoring region and the divisional blocks are integrated as the index value indicating the state of the region serving as the monitoring target, and detects the abnormality when the integrated index value is a threshold value which is set in advance or less.

Further, according to another aspect of the present invention, in the wireless communication device, in the communication failure prediction process, the control unit weights the degree of similarity of each of the divisional blocks according to a degree of importance of each of the divisional blocks, and calculates the integrated index value based on the degree of similarity which is weighted.

Further, according to another aspect of the present invention, in the wireless communication device, the storage unit stores the photographed image, and stores the degrees of similarity of the divisional blocks for a specific period of time for each photographed image, and when the abnormality is detected in the communication failure prediction process, the control unit estimates a cause of the abnormality based on the degrees of similarity of the divisional blocks for the specific period of time until now, includes information indicating the estimated cause in alert information, and outputs the alert information.

Further, according to another aspect of the present invention, provided is a wireless communication system, including: a pair of wireless communication devices which are installed to face each other, wherein each of the wireless communication devices is any of the above wireless communication devices.

Further, according to another aspect of the present invention, in the wireless communication system, when the abnormality is detected in the communication failure prediction process, the control unit of the wireless communication device acquires a processing result of the communication failure prediction process in the counterpart device, adds a processing result in the wireless communication device to the processing result in the counterpart device, and estimates the cause of abnormality.

According to the present invention, provided is a wireless communication device that performs wireless communication with a counterpart device using a directional antenna and includes an imaging unit that has an optical axis which is identical to a radio wave direction of the directional antenna, and photographs an image of a region including the counterpart device serving as a monitoring target, a storage unit that stores a reference image serving as a reference which is photographed by the imaging unit, and a control unit that performs a communication failure prediction process of acquiring a photographed image photographed by the imaging unit at regular intervals, calculating a degree of similarity between the photographed image and the reference image for the region serving as the monitoring target through normalized cross-correlation, calculating an index value of the region serving as the monitoring target based on the degree of similarity which is weighted, detecting an abnormality when the index value is a specific numerical value or less, and outputting alert information including the photographed image when a state in which the abnormality is detected is continued for a certain period of time. Thus, there are effects in that it is possible to reduce a burden on a maintenance person, it is possible to predict the occurrence of a communication failure with a high degree of accuracy by considering a temporal change in a degree of similarity without excessively responding a change in brightness that is not related to communication, and it is possible to prevent erroneous alert activation and improve reliability of communication by preventing a communication failure in advance.

Further, according to the present invention, the control unit sets a monitoring region including the counterpart device and a plurality of divisional blocks obtained by dividing an extended region obtained by extending the monitoring region as the region serving as the monitoring target, and in the communication failure prediction process, the control units calculates the degree of similarity between the photographed image and the reference image for the monitoring region and the divisional blocks, calculates an integrated index value in which the degrees of similarity of the monitoring region and the divisional blocks are integrated as the index value indicating the state of the region serving as the monitoring target, and detects the abnormality when the integrated index value is a threshold value which is set in advance or less. Thus, there are effects in that a degree of similarity is weighted according to a degree of importance or a degree of reliability for each region serving as a monitoring target, and it is possible to monitor the state of the monitoring target finely and comprehensively, and it is possible to detect an abnormality leading to a communication failure with a high degree of accuracy and prevent erroneous alert activation.

Further, according to the present invention, the storage unit stores the photographed image, and stores the degrees of similarity of the divisional blocks for a specific period of time for each photographed image, and when the abnormality is detected in the communication failure prediction process, the control unit estimates a cause of the abnormality based on a change tendency of the degrees of similarity of the divisional blocks for the specific period of time until now, includes information indicating the estimated cause in alert information, and outputs the alert information. Thus, there are effects in that a maintenance person can deal with a cause leading to a communication failure, and reliability of communication can be improved.

BRIEF DESCRIPTION OF DRAWINGS

FIG. 13 is an explanatory diagram illustrating a cause estimation table; and

FIG. 14 is a flowchart illustrating a reference image update process.

DETAILED DESCRIPTION

Hereinafter, an exemplary embodiment of the present invention will be described with reference to the appended drawings.

[Overview of Embodiment]

In a wireless communication system (the present system) according to an embodiment of the present invention, a wireless communication device (the present device) includes an imaging unit having an optical axis which is identical to a radio wave direction of a directional antenna, an image photographed when a condition is good is stored as a reference image, a wireless communication device serving as a communication counterpart and an area around the wireless communication device are photographed, and a control unit compares images photographed at regular intervals with the reference image, calculates a degree of similarity using a template matching technique based on normalized cross-correlation that is hardly influenced by a change in brightness, and activates an alert toward a maintenance terminal when a state in which the degree of similarity is low is continued for a certain period of time. Thus, it is possible to reduce a work burden on a maintenance person and prevent erroneous activation by disturbance noise such as the weather or sunshine, it is possible to easily predict the occurrence of a communication failure with a high degree of accuracy and prevent the occurrence of an actual failure in advance, and reliability of communication can be improved.

The wireless communication device according to an embodiment of the present invention divides a monitoring range into a plurality of blocks, compares the photographed image with the reference image for each block, and calculates a degree of similarity. Thus, it is possible to analyze an image with a high degree of accuracy, estimate a cause of a communication failure based on a change in a degree of similarity for each block, and deal with it rapidly.

Figure 1:
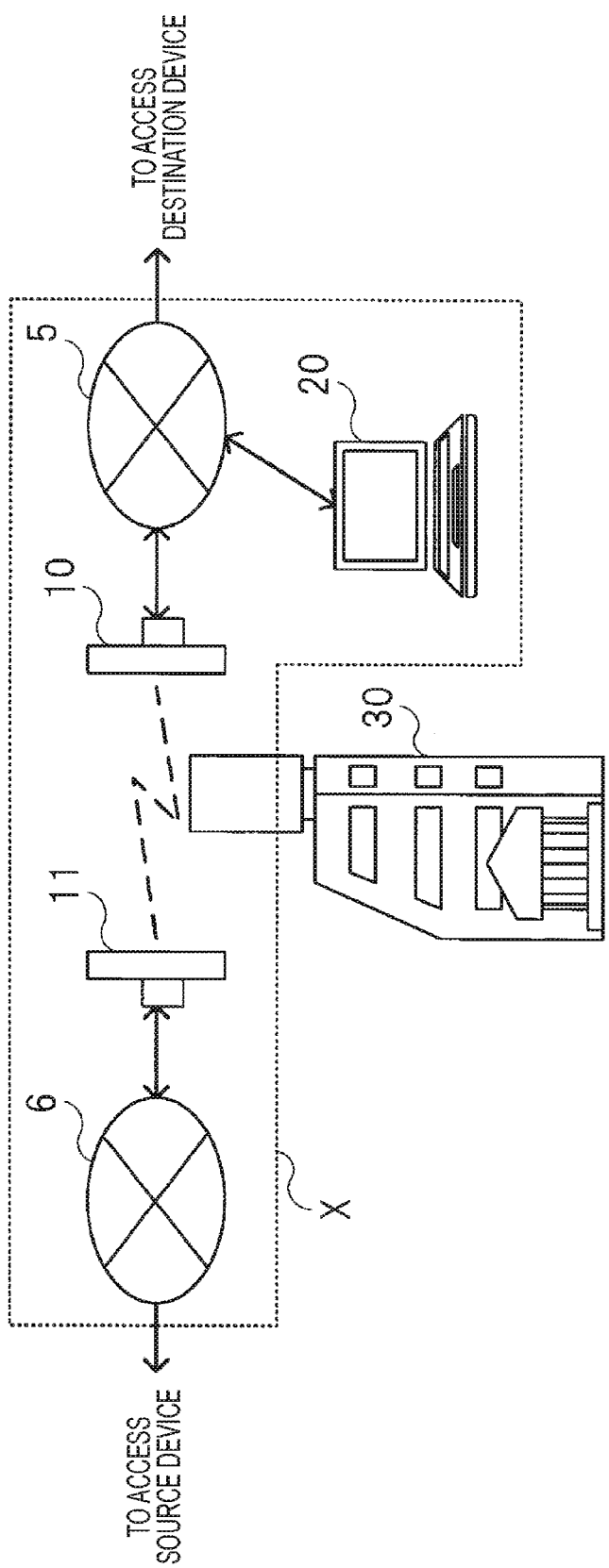
FIG. 1 is a schematic diagram illustrating a configuration of a wireless communication system according to an embodiment of the present invention.

[Configuration of Wireless Communication System According to Embodiment: FIG. 1]

FIG. 1 is a schematic diagram illustrating a configuration of a wireless communication system X according to an embodiment of the present invention. The wireless communication system X is a communication system that relays communication between an access source device and an access destination device, and includes wireless communication devices 10 and 11 and a maintenance terminal 20. In an example of FIG. 1, the wireless communication device 10 is connected with the maintenance terminal 20 and the access destination device via a network 5, and the wireless communication device 11 is connected with the access source device via a network 6.

The wireless communication devices 10 and 11 have the same configuration and are opposed wireless communication devices for P2P communication. The wireless communication devices 10 and 11 function as a wireless repeater for data communication and perform, for example, P2P communication in two directions at a rate of several hundred Mbps or more at a distance of several kilometers (km) using a millimeter waveband or a quasi-millimeter waveband of 25 GHz having high directivity. Depending on a state at the time of activation, one of the wireless communication devices 10 and 11 can be automatically set as a master device, the other can be set as a slave device, and a frequency channel can be also automatically selected. Each of the wireless communication devices 10 and 11 includes an imaging unit that photographs an image, and photographs an image of a counterpart and uses the image for prediction of a communication failure.

As one of features of the present system, for example, when an obstacle 30 (an object) is built to lower the likelihood, and a failure of wireless communication is detected, each of the wireless communication devices 10 and 11 transmits communication failure information including an image to a maintenance device 20. Further, each of the wireless communication devices 10 and 11 regularly photographs an image at predetermined intervals, and transmits alert information including the image and information of an estimation cause to the maintenance device 20 if the image has an abnormality.

The maintenance device 20 is a device such as a personal computer (PC) for maintenance or management, a general-purpose machine, or a server which is used by an administrator of the wireless communication system X. The maintenance device 20 can set various kinds of parameters in the wireless communication devices 10 and 11 and request photographed image data, data of various kinds of sensors, data of a received signal strength, and the like.

The networks 5 and 6 are arbitrary IP networks and connected with the wireless communication devices 10 and 11 by, for example, 1000BASE-T or the like. The networks 5 and 6 can be connected with an access destination device such as a switch, a router, a personal computer (PC), a server, a smart phone, or a tablet. The networks 5 and 6 may be connected with other networks such as the Internet, a mobile telephone network, or a PHS network using a router or the like.

In the present system, in order to detect a communication abnormality between the wireless communication devices 10 and 11 before it actually occurs, an image is photographed and compared with a reference image, analysis is performed, and an alert is output with a high degree of accuracy rapidly based on the analysis. The photographing of the image and the analysis process will be described later in detail. Since the wireless communication devices 10 and 11 have the same configuration and perform the same operation, and in the following description, the wireless communication device 10 will be described as an example.

Figure 2:
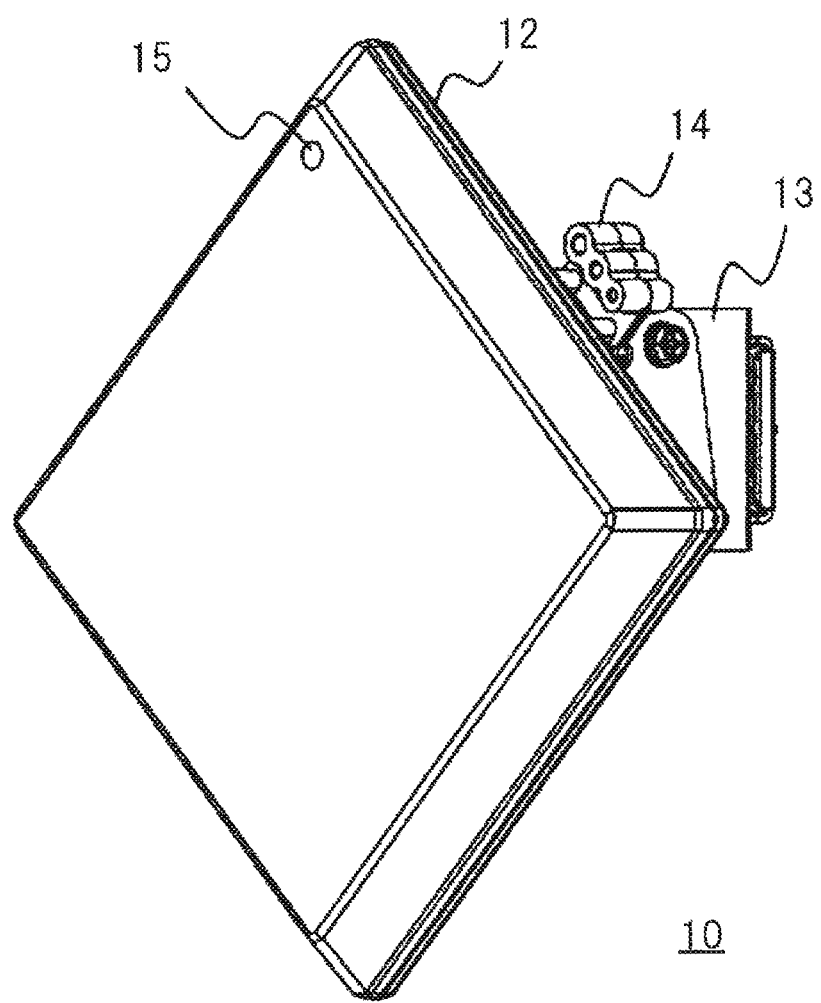
FIG. 2 is an appearance diagram of a wireless communication device 10.

[Appearance of Wireless Communication Device 10: FIG. 2]

Next, an appearance of the wireless communication device 10 will be described with reference to FIG. 2. FIG. 2 is an appearance diagram of the wireless communication device 10. The wireless communication device 10 is mainly configured with a housing 12 in which an antenna, a radio frequency (RF) unit, a signal processing unit (PHY), a MAC processing unit, an interface unit, and the like are integrally installed and a mounting unit 13 serving as a mounting bracket for a pole or the like as illustrated in FIG. 2. The housing 12 includes a scope unit 14 that checks a directivity direction of the antenna. The housing 12 further includes an imaging unit 15 in which an optical axis of a camera is set to be oriented in the same direction as the directivity direction of the antenna. The imaging unit 15 is a camera or the like.

The imaging unit 15 photographs images of the wireless communication device 11 of the communication counterpart and a communication path and photographs, for example, only an image within a viewing angle of several degrees. It is desirable to configure the imaging unit 15 so that it is unable to change the optical axis of the camera by a camera platform or the like. Accordingly, it is possible to reduce privacy problems related to the wireless communication device 10. The imaging unit 15 can be implemented such that a camera sensor module installed in a smart phone or the like is combined with an appropriate fixed zoom lens.

Figure 3:
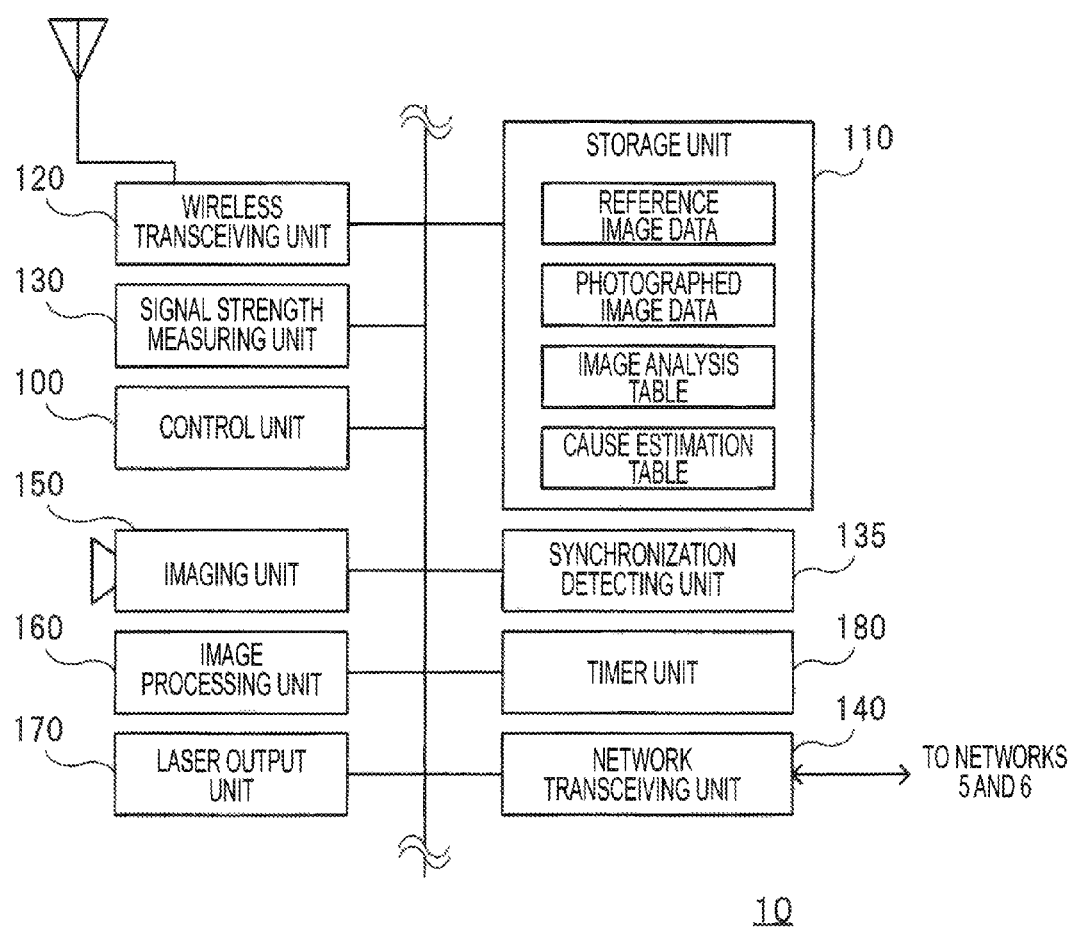
FIG. 3 is a configuration block diagram of the wireless communication device 10.

[Configuration Blocks of Wireless Communication Device 10: FIG. 3]

Next, a specific control configuration of the wireless communication device 10 according to the present system will be described with reference to FIG. 3. FIG. 3 is a functional block diagram of the wireless communication device 10. The wireless communication device 10 mainly includes a control unit 100, a storage unit 110, a wireless transceiving unit 120, a signal strength measuring unit 130, a synchronization detecting unit 135, a network transceiving unit 140, an imaging unit 150, an image processing unit 160, a laser output unit 170, a timer unit 180 in the housing 12 illustrated in FIG. 2 as illustrated in FIG. 3. The respective units are connected via, for example, a common bus or the like. The imaging unit 150 is equivalent to the imaging unit 15 illustrated in FIG. 2.

The respective units of the wireless communication device 10 will be specifically described.

[Control Unit 100]

The control unit 100 is a built-in computer such as a general purpose processor (GPP), a central processing unit (CPU), a digital signal processor (DSP), or a system-on-a-chip (SoC), and controls the respective units.

As control related to a feature of the present device, the control unit 100 instructs the imaging unit 150 to photograph (image) an image including a wireless communication device of a counterpart device. The photographing is performed when a radio wave state acquired at the time of transmission or reception is abnormal and performed based on the timer unit 180 to monitor a communication abnormality at regular intervals before the communication abnormality occurs. For the monitoring of the radio wave state, the received signal strength from the signal strength measuring unit 130 or synchronization detection from the synchronization detecting unit 135 is used. The control unit 100 can give a photographing instruction to the imaging unit 150 in response to an instruction from the maintenance device 20 or an operation by a local worker.

Further, as one of features of the present device, the control unit 100 performs a communication failure prediction process of predicting the occurrence of a failure before a communication failure occurs based on an image that is photographed (a photographed image) and outputting an alert. The communication failure prediction process will be described later.

[Storage Unit 110]

The storage unit 110 is configured with a random access memory (RAM), a read only memory (ROM), a flash memory, a hard disk drive (HDD), or the like, and stores a program or data executed by the control unit 100, various kinds of setting values, and image data. Examples of the image data include reference image data serving as a reference in a normal state, photographed image data photographed in an operation state, and average image data which is an average of photographed images for a certain period of time. The image data will be described later in detail. Examples of the setting value or the data that is stored include a threshold value of signal strength for determining photographing (a signal strength photographing threshold value), a photographing interval setting value, and a data format of alert information.

Further, as one of features of the present device, the storage unit 110 includes an image analysis table in which data for determining whether or not the alert information is output based on analysis of photographed image data is stored and a cause estimation table used as a reference for estimating a cause of detected abnormality before the alert information is output. The tables will be described later.

The storage unit 110 stores a threshold value of a degree of weighted integrated similarity which will be described later and a threshold value of a score. The storage unit 110 may include, for example, a removable recording medium such as a USB memory or an SD card, and the image data can be stored in the recording medium as well.

[Wireless Transceiving Unit 120]

The wireless transceiving unit 120 includes an antenna, a radio frequency (RF) unit (wireless communication unit), a digital modulation/demodulation unit, an analog/digital (A/D) conversion unit, a digital/analog (D/A) conversion unit, an encoding/decoding unit, an encrypting unit, a QoS scheduling unit, and the like, and performs transmission and reception of a wireless signal. The wireless transceiving unit 120 performs adaptive modulation and coding (AMC) so that the best throughput is obtained according to an arbitrary transmission path situation. As the antenna of the wireless transceiving unit 120, a directional antenna such as a pencil beam antenna in which a carrier wave hardly spreads is preferably used. The wireless transceiving unit 120 can perform transmission and reception of a radio wave using a scheme such as time division duplex (TDD) or frequency division duplex (FDD).

[Signal Strength Measuring Unit 130]

The signal strength measuring unit 130 performs measurement of the received signal strength and acquisition of an S/N ratio related to a reception quality on the radio wave received from the wireless transceiving unit 120. When the measurement values are lower than reference values, a notification indicating that the received signal strength is abnormal is given to the control unit 100. When the AMC is performed, the signal strength measuring unit 130 acquires information of a current modulation scheme and an encoding scheme together.

[Synchronization Detecting Unit 135]

The synchronization detecting unit 135 detects a synchronous signal, a preamble, and the like which are included in a received wireless signal, restores the synchronous signal which is wirelessly transmitted, and detects whether or not the synchronous signal is restored. Then, when the detection of the synchronous signal and the preamble is not normally performed, a notification indicating that the synchronization detection is abnormal is given. Commonly, the functions of the signal strength measuring unit 130 and the synchronization detecting unit 135 can be implemented in the wireless transceiving unit 120.

[Network Transceiving Unit 140]

The network transceiving unit 140 is, for example, an interface of a 1000BASE-T/100BASE-TX standard which is used for a connection with the network 5 or 6 and performs a MAC layer process based on a transmission medium. In other words, the network transceiving unit 140 connects a wireless transmission payload which is dealt with through the wireless transceiving unit 120, communication with the maintenance device which occurs through the control unit 100, and the like to the network 5 or 6. For example, the network transceiving unit 140 may include a power supply unit, a battery, and the like which supply electric power according to a Power on Ethernet (PoE) (Ethernet is a trademark). The network transceiving unit 140 may perform a bridge process or a router process.

[Imaging Unit 150]

The imaging unit 150 photographs an image including the wireless communication device 11 of the counterpart in response to an instruction given from the control unit 100, and converts a color/monochrome optical signal for infrared light or visible light to an electrical signal, and includes an imaging element, an A/D converts, and the like. As the imaging element, there are a complementary metal oxide semiconductor (CMOS), a charge coupled device (CCD), and the like.

Here, the imaging unit 150 performs photographing only within a narrow range in which the "likelihood" that radio wave communication to an opposed wireless communication device 11 will arrive without being blocked by an obstacle can be checked. When the imaging unit 150 is configured to perform photographing only within a range of a predetermined angle, for example, a viewing angle of about 0.5° to 5° at which the optical axis of the directional antenna of the wireless transceiving unit 120 is identical to the optical axis of the camera, it is possible to give consideration to privacy.

The imaging unit 150 may include an optical lens, a zoom lens, and a cover that prevents intrusion of rain water, dust, and the like. Using a lens having an appropriate optical zoom magnification, it is possible to reduce the number of pixels necessary for an imaging element. Further, since it is not aimed to photograph a subject moving during the night, it is not necessary to have high sensitivity and use a large imaging element, and thus the cost can be reduced. The imaging unit 150 need not be necessarily configured to be integrated with the wireless communication device 10 and may be separated from the wireless communication device 10. The imaging unit 150 may be configured to photograph a moving image as well as a still image. As will be described later, a laser may be used for determination of the "likelihood."

[Image Processing Unit 160]

The image processing unit 160 performs image processing on the electrical signal output from the imaging unit 150 and performs conversion into a predetermined format, for example, mainly conversion into a still image such as JPEG, JPEG2000, PNG, or BMP. At this time, it is also possible to perform compression of a capacity of an image, conversion into vector data, and the like.

The image processing unit 160 is configured with an image processing computer such as a digital signal processor (DSP), a graphics processing unit (GPU), or an application specific integrated circuit (ASIC).

The image processing unit 160 generates an average image based on a previous photographed image stored in the storage unit 110 and calculates a difference between images. The difference is obtained between the reference image and the photographed image or between the average image and the photographed image.

The image processing unit 160 performs analysis of a noise component or a feature quantity of an image using a fast Fourier transform (FFT), wavelet analysis, or the like. By analyzing the feature quantity, it is possible to determine an obstruction 30 that causes a failure to occur in wireless communication while excluding an environmental cause such as rain, fog, or heat haze.

Further, the image processing unit 160 can also convert chronologically photographed image data into moving image data such as a moving image GIF, AVI, MOV, or MPEG. Accordingly, it is possible to view the progress of construction of a building from the maintenance device 20.

[Laser Output Unit 170]

The laser output unit 170 outputs, for example, a laser signal such as infrared light that can be detected by the imaging unit 150 in the same direction as the radio wave of the antenna of the wireless transceiving unit 120. The control unit 100 can determine whether or not there is the "likelihood" by detecting the laser signal of the laser output unit 170 through the image processing unit 160. The laser light spreads to have an appropriate diameter until arriving at the counterpart device and then is incident on the imaging unit 150. In order to detect a lock-in in the image processing unit of the counterpart device, it is desirable that the laser signal undergo ON/OFF modulation with a known cycle of a lower speed than the photographing rate of the imaging unit 150 or based on a pseudonoise sequence. The synchronization with the counterpart device is performed by a clock that is synchronized according to an NTP which will be described later, a count of a wireless frame number, or the like. The laser signal may be a signal that is transmitted from its own device and reflected by the counterpart device (or an obstacle) or may be a laser signal that is transmitted from the counterpart device. Alternatively, when an aircraft warning light, an obstacle marking, or the like is installed on a building in which the wireless communication device 10 is installed or to lower the likelihood for the counterpart device, it can be substituted.

[Timer Unit 180]

The timer unit 180 is configured with a battery backup real-time clock (RTC) including quartz, an interval timer, or the like and measures a time such as year/date/hour/minute/second. When an image photographing interval is set from the maintenance device 20, the timer unit 180 reports a photographing timing to the control unit 100 at regular intervals. The control unit 100 may acquire the time of the timer unit 180 from a time server on the Internet or the like or may set the time of the timer unit 180.

[Others]

In addition, the wireless communication device 10 may include sensors that acquire data related to a surrounding environment such as rainfall, sunshine, the weather, wind power, a wind direction, temperature, and humidity. Values acquired by the sensors are also stored in the storage unit 110. The wireless communication device 10 may include a reception power monitor terminal which is connected directly with a portable maintenance device, a serial/USB terminal, a wireless LAN interface, or the like.

Figure 4:
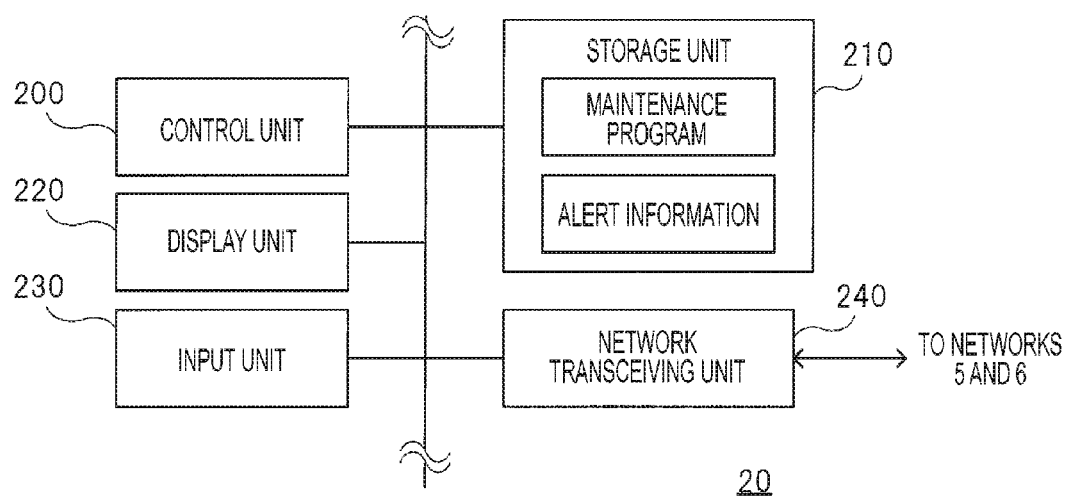
FIG. 4 is a configuration block diagram of a maintenance device 20 of the present system.

[Configuration of Maintenance Device 20: FIG. 4]

Next, a configuration of the maintenance device 20 of the present system will be described with reference to FIG. 4. FIG. 4 is a configuration block diagram of the maintenance device 20 of the present system. The maintenance device 20 of the present system includes a control unit 200, a storage unit 210, a display unit 220, an input unit 230, and a network transceiving unit 240 as illustrated in FIG. 4.

The control unit 200 is an operation device and controls the maintenance device 20 in general. The storage unit 210 stores a maintenance program executed by the control unit 200, stores the alert information transmitted from the wireless communication device 10, and accumulates the alert information. The display unit 220 displays an image or a message included in the alert information so that the image or the message is viewed by the administrator, and displays a screen for maintenance and the like. The input unit 230 inputs an instruction of the administrator, a setting value, and the like. The network transceiving unit 240 is an interface used for a connection with the networks 5 and 6.

Figure 5:
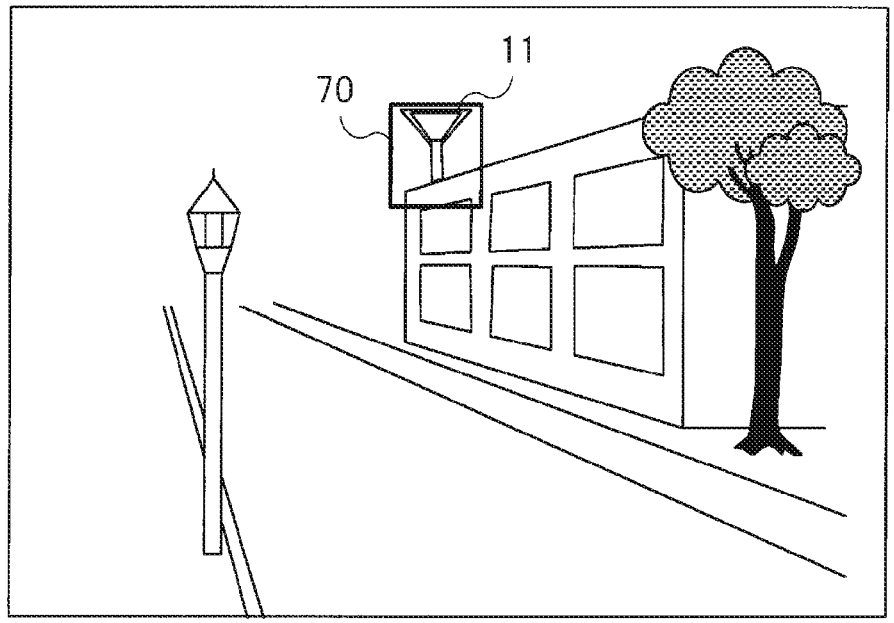
FIG. 5 is an explanatory diagram illustrating an exemplary setting of a monitoring region.

[Setting of Monitoring Region: FIG. 5]

Before an operation according to the present device is specifically described, an exemplary setting of a monitoring region serving as a monitoring target when an image is monitored, and the occurrence of a communication failure is predicted will be described with reference to FIG. 5. FIG. 5 is an explanatory diagram illustrating an exemplary setting of the monitoring region. As illustrated in FIG. 5, when the wireless communication device 11 of the communication counterpart is photographed by the imaging unit 150, for example, an entire image of FIG. 5 is acquired.

In the image, an important monitoring target is the wireless communication device 11 and a neighboring area thereof, and this region is designated as a monitoring region

70. Specifically, for example, when a maintenance person designates a range to be set as the monitoring region 70 by surrounding the range with a rectangle on a screen at the time of initial setting, coordinate data of the monitoring region 70 in the entire image is stored in the storage unit 110 as monitoring region data.

When the optical axis of the camera of the imaging unit 150 and the optical axis of the wireless communication device 10 are identical to each other on hardware, the position of the counterpart communication device 11 in the photographed image can be uniquely decided near the center of the image, and thus the monitoring range 70 may be automatically decided. For the case in which the assembly accuracy is insufficient, an interface in which the user arbitrarily designates the monitoring range is prepared. FIG. 5 illustrates an example in which the monitoring region 70 is set near and above the center of the image, but the monitoring region 70 is actually near the center. A shape for designating the monitoring region 70 is not limited to a rectangle and may be a circle, an ellipse, a polygon, a simple point, or the like. When the monitoring region 70 is designated by a point, it is automatically expanded to a region of a certain size. At the time of comparison of images, the control unit 100 compares the monitoring region 70 of the reference image with the monitoring region 70 of the photographed image, and calculates a degree of similarity.

Figure 6:
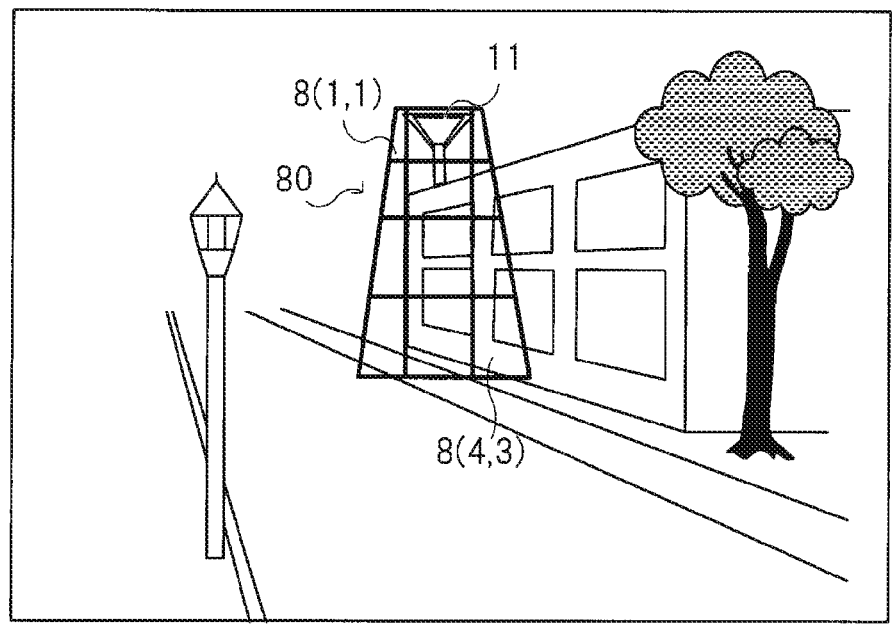
FIG. 6 is an explanatory diagram illustrating an exemplary setting of a divisional monitoring region.

[Setting of Divisional Monitoring Region: FIG. 6]

In the present device, in addition to the monitoring region 70, a divisional monitoring region which is obtained by expanding the monitoring region 70 and divided into a plurality of regions is also monitored as a region of the monitoring target. The divisional monitoring region will be described with reference to FIG. 6. FIG. 6 is an explanatory diagram illustrating an exemplary setting of the divisional monitoring region. As illustrated in FIG. 6, the divisional monitoring region 80 is a region obtained by expanding the monitoring region 70 illustrated 5 to the left, right, top, and bottom, and the entire region is divided into 4×3 columns, that is, divisional blocks 8(1, 1), 8(1, 2), . . . and 8(4, 3) from the upper left to the lower right. Then, the divisional blocks 8(m, n) are compared with the reference image. The divisional monitoring region 80 corresponds to an extended region in claims.

The shape of the divisional monitoring region 80 and the shape of the divisional block may be individually input by the maintenance person, or a shape pattern may be input in advance, and the divisional monitoring region 80 may be specified by the control unit 100 by designating a reference position on a screen. Each of the divisional blocks 8 may partially overlap another divisional block 8.

As the divisional monitoring region 80 is set, it is possible to monitor an image finely, and when a communication failure is predicted to occur, it is possible to estimate a cause thereof. For example, when the degrees of similarity of the divisional blocks 8 of the divisional monitoring region 80 decrease in order from the divisional block 8 at the bottom, a building is considered to be being built. Further, as each divisional block is weighted, it is possible to detect an abnormality having a high emergency rapidly and activate an alert or identify a block that is low in reliability of an image.

Figure 7:
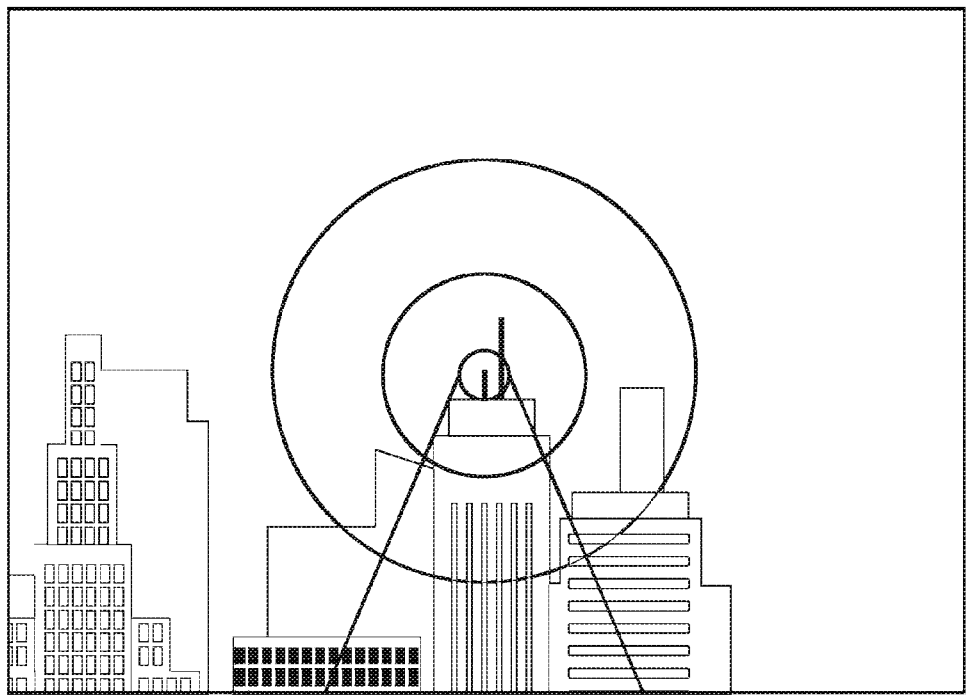
FIG. 7 is a diagram illustrating an example of a photographed image.

FIG. 7 is an explanatory diagram illustrating another exemplary setting of the divisional monitoring region. In this example, when the position of the communication device 11 is designated by a point, three circular regions having different sizes are set at the center of the image, a trapezoidal region extending up to the bottom of the image is automatically set below the circular regions, and the regions can be used for identification using the descending order of the degrees of similarity or the weighting similarly to the divisional blocks in FIG. 6. A wireless transmission path between the communication devices 10 and 11 is considered to be formed in a cylindrical shape in the air, and a cross section thereof is much larger than an image of the communication device 11 in the immediate vicinity of the communication device 10 as in an outer circle in FIG. 7.

Figure 8:
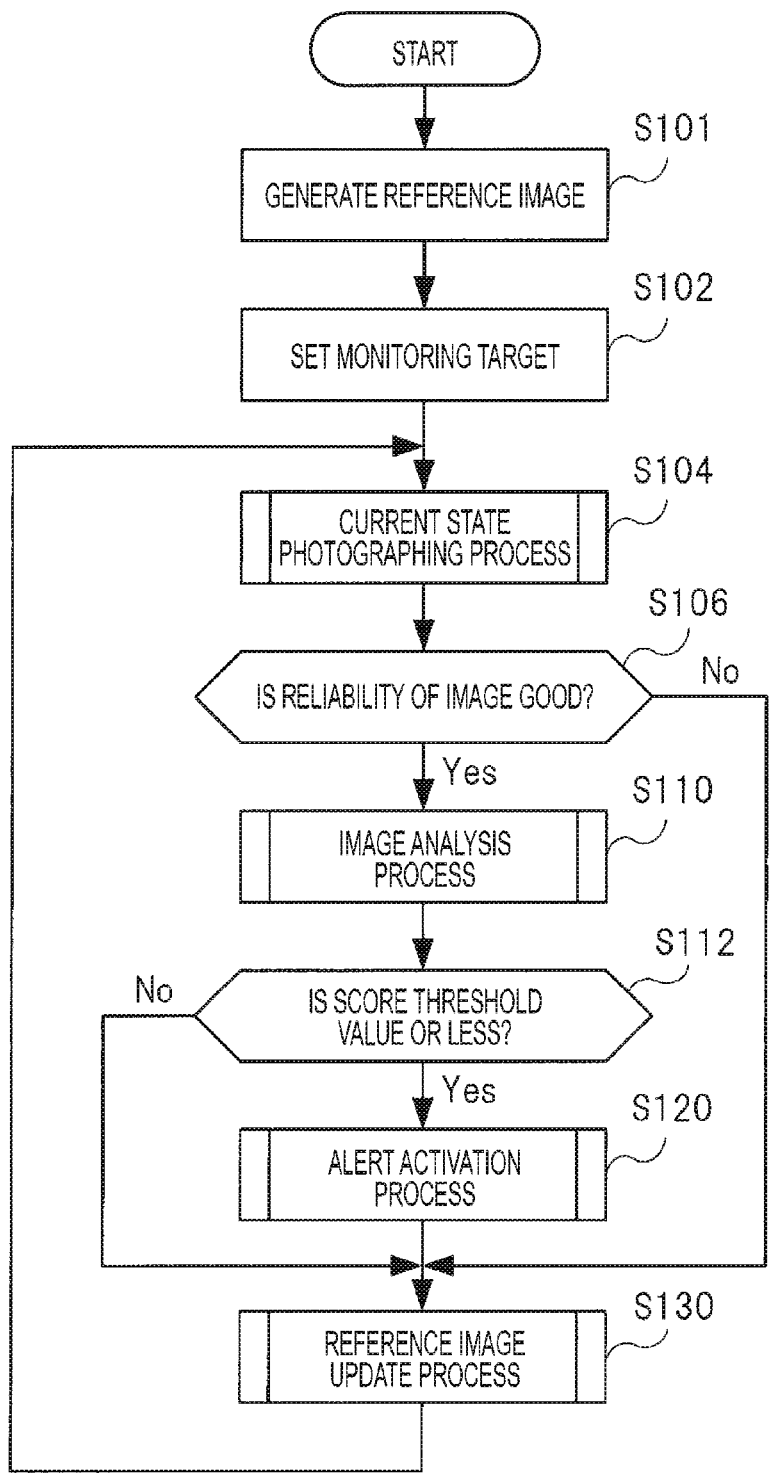
FIG. 8 is a flowchart illustrating an overview of a communication failure prediction process.

[Communication Failure Prediction Process: FIG. 8]

As described above, in the present device, before the received signal strength actually deteriorates due to the communication failure, the communication failure prediction process of discovering a symptom of the communication failure by monitoring an image, estimating a cause thereof, and transmitting the alert information including the image information and the estimation cause is performed. An overview of the communication failure prediction process will be described with reference to FIG. 8. FIG. 8 is a flowchart illustrating an overview of the communication failure prediction process according to the present device. The communication failure prediction process relates to one of features of the present device, and the control unit 100 performs the communication failure prediction process using hardware resources in collaboration with the respective units.

As illustrated in FIG. 8, the present device first generates the reference image used for determining the likelihood for the wireless communication device 11 serving as the communication counterpart (S101). The reference image is an image serving as a template which is compared with the photographed image in template matching of the image analysis process which will be described later. In S101, at least one reference image is generated by averaging images photographed by the imaging unit 150 when the device is installed or in a state in which a field of view is good. As will be described later, a plurality of average images are stored according to an environment such as day or night (time), the weather, or a season, and one image selected from the average images can be used as the reference image. The reference image is converted to have a predetermined data format by the image processing unit 160 and stored in the storage unit 110. As will be described later, the present device checks reliability of the reference image each time the photographed image is analyzed and updates or switches the reference image as necessary.

Further, the present device sets the monitoring region 70 and the divisional monitoring region 80 serving as the monitoring target, and stores the monitoring region 70 and the divisional monitoring region 80 serving as the monitoring target in the storage unit 110 (S102). When the operation of the device starts, the present device performs a current state imaging process of photographing a current state at regular intervals (S104). The current state imaging process will be described later.

Then, when the photographing is performed, the present device determines whether or not a photographing condition is good, that is, whether or not reliability of the photographed image is high (S106). For example, when an image is dark or when a difference with the reference image is very large, the reliability of the photographed image or the reference image is low. When the reliability of the photographed image is determined not to be high (No), the present device proceeds to process S130. As a result, erroneous activation of activating an alert based on an image having low reliability is prevented.

On the other hand, when the reliability of the photographed image is determined to be high in process S106 (Yes), an image analysis process is performed using the photographed image (S110). In the image analysis process, for the monitoring region 70 and the divisional monitoring region 80, the reference image and the photographed image are compared, a degree of similarity is calculated, a degree of similarity is further weighted, an index value is calculated, and a score in which a temporal change in the index value is considered is further calculated. The score is a value serving as an index for determining whether or not states of the monitoring region and the divisional monitoring region in the photographed image indicate that there is a high possibility that a communication abnormality will occur. The present device calculates a degree of similarity using the template matching based on a normalized cross-correlation that is robust against a change in brightness for a calculation of a degree of similarity, and thus erroneous activation caused by a difference in brightness is reduced. The image analysis process will be described later.

Then, the present device determines whether or not the score calculated by the image analysis process (S110) is a threshold value of a score serving as a reference of alert activation or less (S112), and performs an alert activation process when the score is a threshold value or less (a state in which a degree of similarity is low is continued for a certain period of time) (Yes) (S120). The activated alert information includes the photographed image data and information indicating an estimated failure cause. The alert activation process will be described later.

However, when the score exceeds a threshold value (a degree of similarity is high, or a state in which a degree of similarity is low is not continued for a certain period of time) in process S112 (No), the reference image update process is performed (S130), the process proceeds to process S104, and the current state is continuously monitored. An update time constant of the reference image is set to period of time in which the progress in construction of the obstacle 30 can be checked and is commonly several days or more.

As illustrated in FIG. 8, a process of process S104 to process S130 is a loop, and process S104 commonly starts at a timing instructed from the timer unit 180. An execution interval of the loop process is, for example, about 10 minutes to 1 day, can be arbitrarily set from the maintenance device 20, stored in the storage unit 110, and set in the timer unit 180. Further, when the received signal strength measured by the signal strength measuring unit 130 is below the signal strength photographing threshold value which is set in advance and stored in the storage unit 110 or when the user arbitrarily gives an execution instruction, S104 to S130 may be performed immediately regardless of regular execution intervals.

As will be described later, in the communication failure prediction process of the present device, the process in which day or night or the weather is considered is performed, the difference between the normal state and the current state is accurately calculated, it does not excessively respond to a change in brightness which is not related to a communication failure, and thus the alert accuracy is improved. In addition to the monitoring region 70, a degree of similarity of an image is calculated for each divisional block of the divisional monitoring region 80, the occurrence of a communication failure is predicted based on the degree of similarity, and thus it is possible to finely identify the current state and estimate the cause of the communication failure based on a change in a degree of similarity of each divisional block. A processing block in the communication failure prediction process will be specifically described below.

Figure 9:
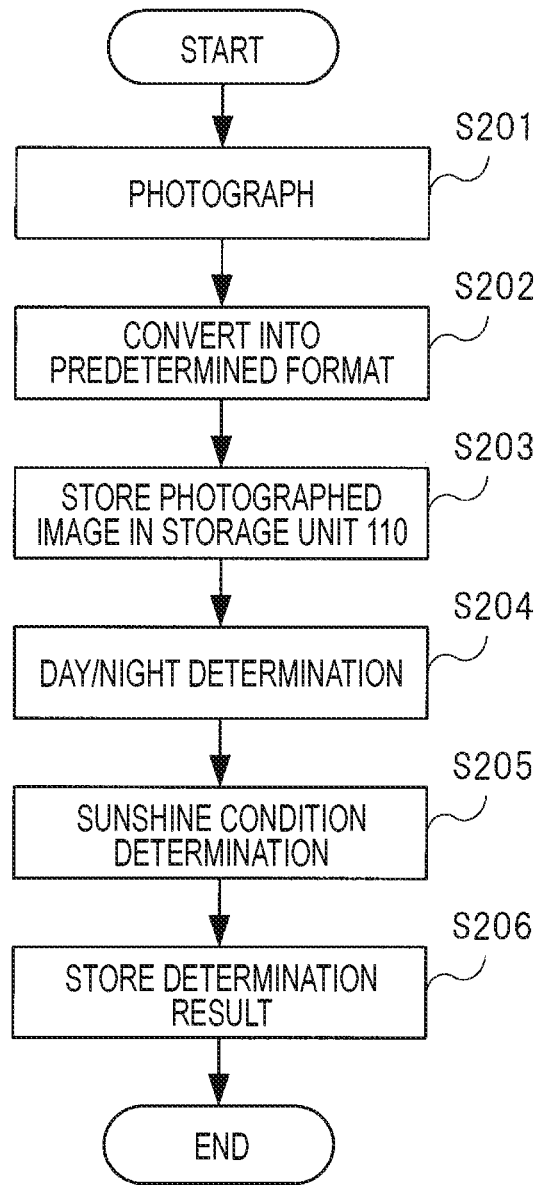
FIG. 9 is a flowchart illustrating a current state imaging process.

[Current State Imaging Process: FIG. 9]

Next, the current state imaging process illustrated in process S104 in FIG. 8 will be described with reference to FIG. 9. As illustrated in FIG. 9, in the current state imaging process, the control unit 100 outputs an instruction to the imaging unit 150 based on a photographing timing from the timer unit 180, and the imaging unit 150 performs photographing (S201). The photographing is limited to photographing by one-time exposure and includes photographing of averaging a plurality of images acquired by a plurality of photographing processes and outputting an average image as one photographed image. The S/N ratio can be improved by averaging several thousands of RAW images photographed for several minutes. At this time, the photographing may be performed while changing an exposure (a shutter speed or a diaphragm) or a focus. In a lens in which an axial chromatic aberration is large, an image in which focusing is improved in any color is obtained by fine motion of a focus. Then, the image processing unit 160 converts the photographed image to have a predetermined data format (S202), and stores the converted photographed image as the photographed image data in the storage unit 110 (S203). Since conversion into the same data format as that of the reference image is performed, the reference image can be compared with the photographed image.

Then, the control unit 100 determines whether or not a current point in time is the day or the night (S204). Since the day and the night differ in, for example, brightness and white balance of an image, the reference image is switched, or significance of the difference with the reference image is determined in view of it. As the day/night determination method, for example, a sunrise time and a sunset time of latitude and longitude of a spot at which the present device is installed are stored in the storage unit 110 in advance, and the control unit 100 acquires a current date and time from the timer unit 180, compares the current date and time with the sunrise time and the sunset time which are stored, and determines the day or the night.

Further, the control unit 100 determines a sunshine (weather) condition at a current point in time (S205). For example, even in the day, a sunshine state differs according to whether the weather is fine, cloudy, rainy, or foggy, and a shaded form or the like changes according to the difference, and thus it is to prevent a phenomenon that a difference with the reference image increases and an alert is activated. In the sunshine condition, luminance can be represented by brightness indicated by, for example, an average value of luminance of the entire screen or a region which is hardly influenced by artificial light by the image processing unit 160.

In the sunshine condition, atmospheric transparency may be acquired by, for example, a method of measuring a contrast level and when the contrast is small, recognizing a state in which visibility (a field of view is bad) is bad such as fog or snow or obtaining the S/N ratio of the entire screen. Alternatively, weather information data may be acquired from the outside via a network and used. When the sunshine condition is obtained with a high degree of accuracy, the day/night determination in S204 can be spontaneously performed.

A day/night determination result and a sunshine condition determination result include information indicating the brightness (luminance), the contrast, and the S/N ratio at the time of photographing, and the control unit 100 associates the determination results with the photographed image data as brightness information and stores resulting data in the storage unit 110 (S206), then ends the current state imaging process, and causes the process to proceed to process S106 of FIG. 8.

In process S106 in FIG. 8, the control unit 100 evaluates the reliability of the photographed image based on the brightness information stored in the storage unit 110, and can determine reliability of the image to be low, for example, when visibility is bad (it is not clearly seen) or when the contrast or the S/N ratio differ from those of the reference image.

Figures 10A, 10B:
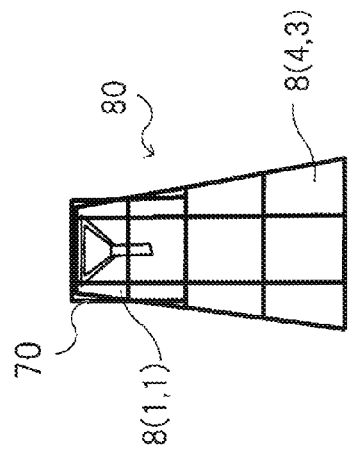
FIGS. 10A and 10B are explanatory diagrams illustrating an image analysis table.

[Image Analysis Table: FIGS. 10A and 10B]

Here, the image analysis table stored in the storage unit 110 will be described with reference to FIGS. 10A and 10B. FIG. 10A is a diagram illustrating a region serving as the monitoring target, and FIG. 10B is an explanatory diagram illustrating an example of the image analysis table. The image analysis table illustrated in FIG. 10B is a table in which a degree of similarity, various kinds of statistical values, and various kinds of data set in advance for predicting whether or not a communication failure occurs which are calculated for the monitoring region 70 of the monitoring target and the divisional blocks 8 of the divisional monitoring region 80 illustrated in FIG. 10A are stored in association with the photographed image data. The data stored in the image analysis table is used for calculating an index value used for determining whether a state of the monitoring target in the photographed image is normal or abnormal.

Specifically, as illustrated in FIG. 10B, in the image analysis table, for the monitoring region 70 and each of 12 divisional blocks 8 of the divisional monitoring region 80, a degree of similarity, an average value of degrees of similarity, a standard deviation, a threshold value, a correction value of normalization correction, a region weighting coefficient, and a degree of reliability are stored, and a degree of weighted integrated similarity, a normal/abnormal class, and a score are stored in association with the entire region of the monitoring target.

Each item will be described.

The degree of similarity is a value calculated in the image analysis process which will be described later, and as the degree of similarity increases, a possibility that a communication failure will occur decreases, and as the degree of similarity decreases, a possibility that a communication failure will occur increases. Here, the degree of similarity of the monitoring region 70 nearby the wireless communication device 11 has a high value of 0.95, but the degree of similarity of the divisional block 8(4, 3) which is a lower right block of the divisional monitoring region 80 has a low value of 0.41.

The average is an average value of the degrees of similarity calculated in the past for a certain period of time, and the standard deviation (σ) is a standard deviation of the degrees of similarity calculated for the same certain period of time. The average and the standard deviation are updated each time the degree of similarity is calculated in the image analysis process. When the average and the standard deviation are desired to be exactly calculated, it is necessary to store values of all the degrees of similarity calculated for a certain period of time, and thus the average and the standard deviation may be approximately calculated based on the average value, the standard deviation, and the degree of similarity which are currently stored.

The threshold value is a reference value used for classifying whether a degree of similarity of each region is normal or abnormal and a value that is given in advance. It is determined to be normal when it is larger than the threshold value and determined to be abnormal when it is the threshold value or less. In the present embodiment, each region has a different threshold value, and in the example of FIGS. 10A and 10B, the threshold value is set to a smaller one of (average value −2σ) and 0.80. For example, the threshold value of the monitoring region 70 is 0.79, and the threshold value of the divisional block 8(2, 1) is 0.62. All the threshold values may be set to the same fixed value or may be set to (average value −3σ). In the present embodiment, since an image is comprehensively evaluated using the degree of weighted integrated similarity which will be described later, the threshold value is not mandatory, but determination of each monitoring region or each divisional block using the threshold value may be used as a main entity, and comprehensive determination may be performed based on, for example, the number of regions determined to be abnormal or an order relation in which abnormal regions appear.

The correction value of normalization correction is a correction value used for normalizing a degree of similarity between regions. Since easiness of obtaining a high degree of similarity differs according to a picture in a region, for example, the degree of similarity is corrected by allocating a correction value larger than 1 to a region that is low in the average value of the degree of similarity. The region weighting coefficient is a coefficient of weighting a degree of similarity according to a degree of importance derived from, for example, a spatial position of a region, and is used to adjust a degree of contribution as to how much a degree of similarity of each region is reflected in comprehensive determination as to whether or not a communication failure occurs.

In the example of FIG. 10B, the region weighting coefficient of the monitoring region 70 covering the wireless communication device 11 that is highest in a degree of importance is largest, that is, 0.5, and the region weighting coefficient of each divisional block of the divisional monitoring region 80 decreases as a distance from the monitoring region 70 increases. In other words, an obstacle occupying the monitoring region 70 is deadly for wireless communication, but an obstacle involved with the divisional block 8(4, 3) merely blocks a part of the transmission path when it is close to the wireless communication device 11. Here, the sum of the region weighting coefficients is set to 1.

The degree of reliability is an index indicating a degree of contribution of a degree of similarity calculated in each region when it is comprehensively determined whether or not a communication failure occurs based on the photographed image. For example, in the example of FIG. 10B, the monitoring region 70 has a degree of reliability of 1.0, it indicates that the degree of similarity of the monitoring region makes a significant contribution to determination of the occurrence of a communication failure, but the divisional block 8(4, 3) has a degree of reliability of 0.00, and it indicates that the degree of similarity of the divisional block makes no contribution to determination of prediction of a communication failure using the photographed image that is currently photographed.

In the image analysis table, the numerical values of the threshold value, the correction value of normalization correction, the region weighting coefficient, and the degree of reliability may be fixedly set from the maintenance device 20 before an operation of the device starts or may be adaptively controlled according to a value such as a degree of similarity calculated in the image analysis process.

The degree of integrated similarity (the degree of weighted integrated similarity) is an index value indicating a degree of similarity between the photographed image and the reference image in terms of the entire region of the monitoring target. As will be described later, the degree of integrated similarity is calculated by multiplying the degree of similarity of each region serving as the monitoring target by the normalized correction value, the region weighting coefficient, and the degree of reliability stored in the image analysis table and adding resulting values. Since there are three coefficients by which the degree of similarity is multiplied, some of the coefficients may be manually set (fixed), and the remaining coefficients may be automatically set (variable).

The normal/abnormal class is a classification result indicating whether or not the region of the photographed image serving as the monitoring target is "normal" (1) or "abnormal" (0) as a hole by comparing the degree of integrated similarity with the threshold value of the degree of integrated similarity which is stored. The score is a value obtained by averaging or accumulating the classification results for a certain period of time. As the score is calculated, a temporal continuation state of the normal/abnormal state is reflected. The degree of integrated similarity, the normal/abnormal class, and the score need not be necessarily identical to the number of regions and need not be necessarily stored in a table form.

Further, in the present device, the data of the image analysis table is stored in the storage unit 110 for a certain period of time, and the cause of the communication failure is estimated using the data at the time of alert activation.

Figure 11:
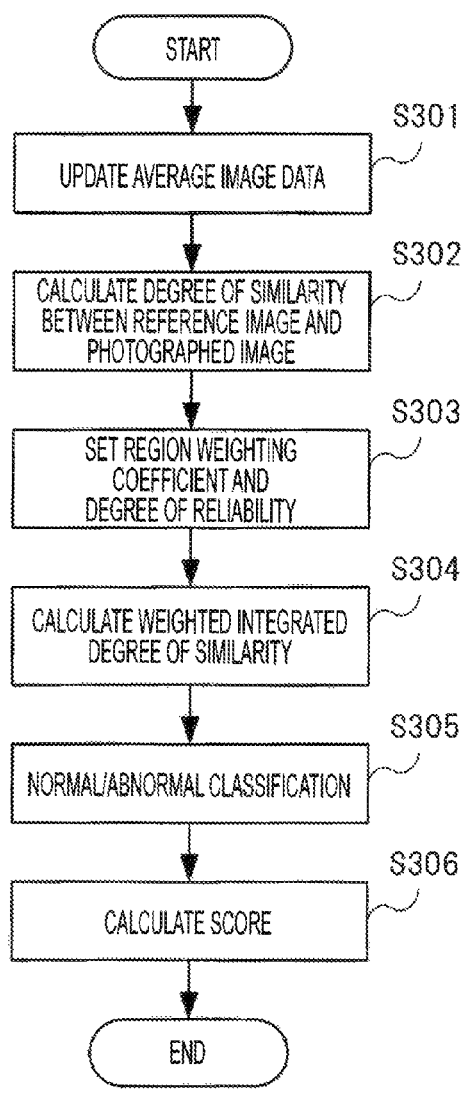
FIG. 11 is a flowchart illustrating an image analysis process.

[Image Analysis Process: FIG. 11]

Here, the image analysis process illustrated in process S110 in FIG. 8 will be described with reference to FIG. 11. The image analysis process is mainly related to a process in which the control unit 100 or the image processing unit 160 calculates the score based on the image analysis table illustrated in FIGS. 10A and 10B. Initially, in S301, the average image of the photographed image is updated and stored in the storage unit 110. The average image is an image obtained by index moving averaging of the photographed images obtained for a specific period of time from the past to the present, and a plurality of versions may be created according to day or night (time), the weather, a season, or the like. The updating in S301 is performed such that the average image employed as the current reference image is replaced or such that the average image is generated separately from the employed average image, and the average image which is separately generated may be used, for example, when the employed average image is not (temporarily) appropriate.

The average image is updated when the reliability of the photographed image is determined to be high in process S106 in FIG. 8. The average image data may be updated only when no abnormality is found to be in a video during several days in which the weather condition is good immediately after the user installs the communication device or immediately after the user checks visually.

Then, in S302, the reference image and the photographed image are compared using the template matching, and the degree of similarity is calculated (S302). Specifically, the degrees of similarity between the reference image and the photographed image for the monitoring region 70 and the divisional monitoring region 80 are obtained. As the reference image, one optimal image is selected among a plurality of average images based on the information (the brightness information) such as day or night or the weather acquired in the current state imaging process in FIG. 9. The calculation of the degree of similarity is performed by a comparison of the image data of the regions at the same position (the same coordinates), and the degree of similarity is calculated by comparing the reference image with the photographed images of the monitoring regions 70 and the divisional blocks 8(1, 1) to 8(4, 3) of the divisional monitoring region 80.

At this time, the present device performs an operation based on the normalized cross-correlation which is a sort of template matching technique and robust against a change in brightness. In the normalized cross-correlation, since a change in brightness is not excessively detected compared to the determination based on the luminance difference according to the related art, it is possible to reduce erroneous alert activation caused by a difference in brightness although many types of average images are not used.

When luminance of pixels of the monitoring region 70 of the reference image data is indicated by T, luminance of pixels of the monitoring region 70 of the photographed image data is indicated by I, and the monitoring region 70 is a rectangle having a width of M and a height of N, a degree of similarity $R_{zncc}$ is indicated by Formula (1) based on the normalized cross-correlation.

[Mathematical Formula 1]

$$R_{zncc} = \frac{\sum_{j=0}^{N-1}\sum_{i=0}^{M-1}((I_{(i,j)}-\bar{I})(T_{(i,j)}-\bar{T}))}{\sqrt{\sum_{j=0}^{N-1}\sum_{i=0}^{M-1}(I_{(i,j)}-\bar{I})^2 \times \sum_{j=0}^{N-1}\sum_{i=0}^{M-1}(T_{(i,j)}-\bar{T})^2}} \quad \text{(Formula 1)}$$

For a calculation of the degree of similarity, instead of the normalized cross-correlation, a sum of absolute difference (SAD) may be obtained after contrast correction such as histogram equalization or a degree of similarity of histogram after equalization (histogram intersection) may be used. Alternatively, a scalar product of a singular vector obtained by singular spectrum transformation in which a pixel value vector is input, a comparison (distance) of feature qualities of scale-invariant feature transform (SIFT), or the like may be used. The same calculation is performed for the respective divisional blocks 8 of the divisional monitoring region 80. Then, the control unit 100 temporarily stores the degrees of similarity calculated for the monitoring region 70 and the divisional blocks of the divisional monitoring region 80 in the image analysis table. The average value and the standard deviation of the degrees of similarity for the respective regions are calculated and stored in the image analysis table as well.

Using the normalized cross-correlation, the number of stored average images can be reduced, but when the brightness information acquired in the current state imaging process of S104 indicates more types of detailed photographing environments, the degree of similarity is corrected based on the brightness information, and thus robustness can be further improved.

Then, in S303, the control unit 100 performs statistical or temporal transitional analysis on the calculated degree of similarity of each region, decides the threshold value, the region weighting coefficient, and the degree of reliability of the corresponding region, and stores the threshold value, the region weighting coefficient, and the degree of reliability in the image analysis table. When the threshold values are used as fixed values, S303 is unnecessary, or it is performed only for a certain period of time after installation. For example, the average and the standard deviation (σ) of the degrees of similarity of the photographed image data acquired at the same time of each day for past three months are calculated, and an average value −2σ or an average value −3σ is set as the threshold value.

For the degree of reliability, the degree of reliability of a region which is explicitly different from a tendency of the degree of similarity of the entire divisional monitoring region 80 such as a region in which the standard deviation of the degree of similarity is remarkably larger than other regions is set to be low. Particularly, for a region in which the brightness information of the photographed image data is remarkably different from the brightness information of the reference image, the degree of reliability of the region is set to be low in process S303, and a contribution rate to determination is decreased. Further, for a region which is easily influenced by the weather condition or noise and has a lot of records of erroneous activation, the degree of reliability is set to be low. For a region in which an average of the degrees of similarity for a long period of time is low, reliability is low, and the degree of reliability is set to be low.

Alternatively, the region weighting coefficient or the degree of reliability of other regions may be changed based on a current degree of similarity of a certain region or an average degree of similarity for a short period of time in the past. For example, as construction of the obstacle 30 progresses upwards, when the degree of similarity of the divisional block 8(4, 2) is low, a weight of the divisional block 8(3, 2) positioned in an upper portion is increased. As a result, when the obstacle 30 has influence on both of the divisional blocks 8(3, 2) and 8(3, 2), it is possible to allocate a weight exceeding linear addition actually, and it is possible to allocate a different weight according to an order in which it has influence on a divisional block. Thus, it is possible to calculate the degree of integrated similarity in which co-occurrence between regions is considered.

The present device stores information serving as a reference for setting the degree of reliability in the storage unit 110, and the control unit 100 sets the degree of reliability of each region based on the information. As the degree of reliability is adjusted, in the determination as to whether or not the communication failure occurs, it is possible to improve the accuracy of determination by increasing a contribution of a degree of similarity of the region having high reliability in which the current monitoring target is accurately reflected and reducing a contribution of a degree of similarity of a region having low reliability in which the current monitoring target is unlikely to be accurately reflected.

Then, in S304, the control unit 100 calculates the degree of integrated similarity (integrated index value) using the degree of similarity and the numerical value stored in the image analysis table. The degree of integrated similarity is calculated by dividing a total sum of values of (degree of similarity×region weighting coefficient×normalized correction value×degree of reliability) of the respective regions by a total sum of the degrees of reliability. In other words, the degree of integrated similarity=Σ (degree of similarity×region weighting coefficient×normalized correction value×degree of reliability)/Σ degree of reliability.

The degree of integrated similarity is an index value indicating how much the region of the monitoring target analyzed in the photographed image is similar to the reference image as a whole, and a contribution of the degree of similarity of an important region or a region having high reliability is large.

Then, in S305, the control unit 100 classifies the normal/abnormal class for the degree of integrated similarity which is calculated, and stores "1" in the image analysis table when it is normal and stores "0" in the image analysis table when it is abnormal. In a simple example, it is determined whether it is normal or abnormal by comparing the current degree of integrated similarity with the threshold value of the degree of integrated similarity stored in the storage unit 110.

Further, as a complicated technique, the degree of integrated similarity is not used, for example, a method of learning a multivariate distribution of degrees of similarity in a spatiotemporal direction by a learning technique such as a random forest which is a sort of machine learning algorithm, a one-class support vector machine, or AdaBoost, inputting the degrees of similarity for a certain period of time in the past from the present (which are multiplied by the region weighting coefficient or the like), and classifying them into the normal class and the abnormal class may be used. They need not be necessarily classified into two classes in the spatiotemporal direction, a class such as "indeterminate" may be set, the abnormal class may be classified for each cause such as deviation of the camera or an obstacle, and a continuous quantity of a classifier output may be used without change rather than a discrete quantity such as a class.

Finally, in S306, the control unit 100 calculates the score which is an index indicating whether or not an alert is immediately activated based on a classification result of each region. For example, the score is a value by which it is possible to easily determine the abnormal state is continued in the region of the monitoring target just by performing the threshold value process on the value. For example, it is an average value of classification results for recent three days. After S306, the process proceeds to process S112 of FIG. 8. By detecting the abnormal state based on the score, it is possible to prevent detection of an abnormality caused by a temporary image change such as a state in which a parked vehicle, a passer, or a bird is stationary. After S306, the process proceeds to process S112 of FIG. 8.

Then, in process S112 in FIG. 8, the control unit 100 determines whether or not an alert is immediately activated based on the calculated score. For example, when the calculated score is the threshold value of the score stored in the storage unit 110 (for example, 0.2) or less, the alert activation process of transmitting the alert information to the maintenance device 20 is performed.

The score is the threshold value or less when the state classified as the "abnormal" class is continued for a certain period of time or when an unstable state in which the "normal" state and the "abnormal" state are mixed, but the "abnormal" state is large, that is, the "abnormal" state is intermittently continued is continued. Thus, in the present device, it is possible to prevent detection of an abnormality caused by a temporary image change by a bird, a flying object, construction equipment, or the like, and it is possible to observe an obstacle that progresses slowly but certainly and is likely to interfere with the transmission path such as a building that is being built before it blocks a communication radio wave actually and activate an alert.

As a simple process, a period of time in which the state classified as the "abnormal" class is continued may be obtained as the score in process S306. In this case, when a period of time in which the "abnormal" state is continued exceeds a specific period of time (a threshold value) in process S112 in FIG. 8, for example, when it is determined to be "abnormal," the alert activation process (S120) is performed.

[Alert Activation Process]

Figure 12:
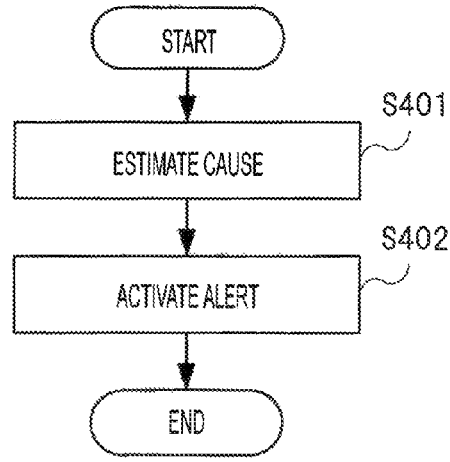
FIG. 12 is a flowchart illustrating an alert activation process.

Next, the alert activation process S120 of FIG. 8 will be described in detail with reference to FIG. 12. The alert activation process S120 includes a cause estimation process S401 and an activation execution process S402. In the cause estimation process S401, the control unit 100 estimates a cause of the occurrence of abnormality based on data of the image analysis table in a specific period of time until now, which is stored in the storage unit 110 or data of the received signal strength, and performs screening as necessary. Specifically, a spatial distribution or a temporal distribution of feature quantities (degrees of similarity of respective regions or the received signal strength) is obtained and compared with the cause estimation table (FIG. 13) stored in the storage unit 110, and a cause of abnormality is estimated based on a change tendency. The cause estimation process S401 is effective when erroneous activation is likely to occur in the determination of S306 only and may be omitted since it is not mandatory.

For example, when it is detected that the degree of similarity of the divisional monitoring region decreases in order from the divisional block at the bottom, the control unit 100 estimates that it is a failure caused by a new building based on the cause estimation table. In the present device, for example, a parameter for detecting a change tendency of each feature quantity is stored, and the control unit 100 detects the change tendency of the feature quantity based on the parameter. An example of the cause estimation table will be described later.

For example, a distribution of degrees of similarity in the spatiotemporal direction when there are the normal state and various kinds of communication obstruction factors may be learned through the machine learning technique in advance, and the cause may be estimated by comparing the learning result with the image analysis data and the received signal strength data actually stored in the storage unit 110.

Further, when the device predicts the occurrence of a communication failure, the counterpart device constituting a pair is likely to predict the occurrence of a communication failure, and thus the cause may be estimated by acquiring the processing result of the counterpart device through communication and considering the processing result of the counterpart device together with the processing result of its own device.

In the activation execution process S402, the control unit 100 transmits recent photographed image data and the alert information including the estimated cause information to the maintenance terminal 20 (S402), and then the reference image update process illustrated in process S130 in FIG. 8 is performed.

Further, after the alert is activated, the control unit 100 may receive an analysis result of the photographed image data or the like by the user from the maintenance terminal 20, acquire information indicating whether or not the alert is erroneously activated or a true cause, and adjust a subsequent process. For example, when the alert is erroneously activated or when the estimation cause is wrong, the accuracy is considered to be further improved by reflecting the degree of reliability of each region in the image analysis table at the time of next photographing.

[Cause Estimation Table: FIG. 13]

Next, the cause estimation table will be described with reference to FIG. 13. FIG. 13 is an explanatory diagram illustrating the cause estimation table. The cause estimation table is used to estimate an alert activation cause with reference back to the degree of similarity serving as an origin of the score in the cause estimation process S401, and stores the change tendency (pattern) of the feature quantity and a possibility of a cause considered when such a change tendency appears in association with each other. In the example of FIG. 13, a possibility that a new building, device deviation, a camera failure/contamination will be a cause is indicated in three steps according to the change tendency and stored.

For example, when the degrees of similarity decrease in order from the divisional block 8 at the bottom in the divisional monitoring region 80, a possibility that a new building will be a cause is considered to be high, and there is a possibility that a camera failure/contamination will be a cause. However, a possibility that device deviation will be a cause is low. Similarly, in the counterpart communication device 11, when abnormality is determined in the communication failure prediction process similar to that in the present device, a possibility that a new building will be a cause is high, and a possibility that the other things will be a cause is low. Further, when normality is determined in the counterpart communication device, the likelihood from the counterpart is good, and thus a possibility that device deviation or a camera failure/contamination will be a cause rather than a new building is high.

Further, although not illustrated in FIG. 13, when the degree of similarity is simultaneously lowered in all the divisional blocks, a possibility that camera deviation or influence of weather noise will be a cause is high. In the present device, the control unit 100 specifies a probable cause by obtaining the tendency of the stored image analysis data or the received signal strength data in the cause estimation process S401 and comparing it with the cause estimation table of FIG. 13. As an estimation cause to be transmitted as the alert information, one estimation cause may be transmitted, or a plurality of estimation causes may be transmitted in the descending order of possibilities. Preferably, the cause estimation process is described in a shell script that is easily programmable and executed, and the cause estimation table may be described in the script.

[Reference Image Update Process: FIG. 14]

Next, the reference image update process of process S130 of FIG. 8 will be described with reference to FIG. 14. FIG. 14 is a flowchart illustrating the reference image update process. As illustrated in FIG. 14, when the reference image update process starts, the control unit 100 evaluates reliability of the current reference image (S501). The reliability of the reference image is evaluated such that the control unit 100 analyzes the alert activation frequency or the average value or the standard deviation of the degree of similarity obtained by analyzing temporal transition of the degree of similarity of the divisional monitoring region in the image analysis process, calculates the index value indicating the reliability of the reference image, compares the index value with the threshold value of the index value indicating the reliability of the reference image which is set in advance, and evaluates the reliability of the reference image.

The reliability of the reference image may be visually determined by the maintenance person or the like. For example, when a cause is estimated to have no influence on communication in the cause estimation process S401 at the time of alert activation, the reliability of the reference image data is evaluated to be low. As the cause having no influence on communication, there are a change in season, deviation of a communication device, and the like.

Then, the control unit 100 compares the calculated index value with the threshold value and determines whether or not the reliability is low (S502). When the index value is the threshold value or more, and the reliability of the reference image is not low (No), the update of the reference image is unnecessary, and the reference image update process ends.

Further, when the index value is less than the threshold value, and the reliability of the reference image is low in process S502 (Yes), the control unit 100 updates the reference image stored in the storage unit 110 (S503), and ends the reference image update process. A new reference image may be an image photographed at a current time when the photographing condition is god or may be the average image which is stored.

The reliability of the reference image is considered to be low when a lot of noise is included in an initial photographed image, and a state in which the degree of similarity is low is continued from the beginning stage of operation or when a season, or a surrounding environment changes from when an initial photographed image is obtained, and the degree of similarity is lowered. Thus, at the beginning stage of operation, when a state in which the degree of similarity is high is not observed for a certain period of time, the reliability of the reference image is regarded to be low, and it may be automatically updated. Further, when there is a tendency that the degree of similarity is lowered in a long-term operation state, the reference image data may be updated at regular intervals by maintenance after checking that there is no abnormality of the occurrence of a communication failure through the maintenance person.

Then, the control unit 100 proceeds to process S104 in FIG. 8, and performs the current state imaging process again at a next timing. The process of the present device is performed as described above.

Thus, in the present device and the present system, although the maintenance person does not frequently visit the installation places of the wireless communication devices 10 and 11, it is possible to detect a situation in which there is an obstacle that lowers the "likelihood," or a failure may occur before a communication failure actually occur, and thus the communication failure can be prevented in advance, and the reliability of communication can be improved. Further, the maintenance person can discover the abnormal state that may lead to a communication failure by monitoring the maintenance device 20, and thus the maintenance load can be significantly reduced. The configuration and the operation according to the above embodiment are an example, and various changes can be made within the scope not departing from the gist of the present invention.

The present invention is suitably applied to a wireless communication device and a wireless communication system, which are capable of reducing a maintenance load, predicting the occurrence of a communication failure with a high degree of accuracy, and thus improving reliability of communication.

What is claimed is:

1. A wireless communication device that performs wireless communication with a counterpart device using a directional antenna, comprising:
    an imaging unit that has an optical axis which is identical to a radio wave direction of the directional antenna, and photographs images of regions corresponding to the counterpart device serving as a monitoring target;
    a storage unit that stores a reference image serving as a reference which is photographed by the imaging unit; and
    a control unit that performs a communication failure prediction process of acquiring a photographed image photographed by the imaging unit at regular intervals, calculating a degree of similarity between the photographed image and the reference image for each of the regions serving as the monitoring target through normalized cross-correlation, calculating an index value representing a state of the regions serving as the monitoring target based on degrees of similarity which is weighted, detecting an abnormality when the index value is a specific numerical value or less, and outputting alert information including the photographed image when a state in which the abnormality is detected is continued for a certain period of time;
    wherein the control unit sets a monitoring region including the counterpart device and a plurality of divisional blocks obtained by dividing an extended region obtained by extending the monitoring region as the region serving as the monitoring target, and in the communication failure prediction process, the control units calculates the degree of similarity between the photographed image and the reference image for the monitoring region and the plurality of divisional blocks, calculates an integrated index value in which the degrees of similarity of the monitoring region and the plurality of divisional blocks are integrated as the index value indicating the state of the region serving as the monitoring target, and detects the abnormality when the integrated index value is a threshold value which is set in advance or less.

2. The wireless communication device according to claim 1,
    wherein in the communication failure prediction process, the control unit weights the degree of similarity of each of the plurality of divisional blocks according to a degree of importance of each of the plurality of divisional blocks, and calculates the integrated index value based on the degree of similarity which is weighted.

3. The wireless communication device according to claim 1,
    wherein the storage unit stores the photographed image, and stores the degrees of similarity of the plurality of divisional blocks for a specific period of time for each photographed image, and
    when the abnormality is detected in the communication failure prediction process, the control unit estimates a cause of the abnormality based on the degrees of similarity of the plurality of divisional blocks for the specific period of time until now, includes information indicating the estimated cause in alert information, and outputs the alert information.

4. The wireless communication device according to claim 2,
    wherein the storage unit stores the photographed image, and stores the degrees of similarity of the plurality of divisional blocks for a specific period of time for each photographed image, and
    when the abnormality is detected in the communication failure prediction process, the control unit estimates a cause of the abnormality based on the degrees of similarity of the plurality of divisional blocks for the specific period of time until now, includes information indicating the estimated cause in alert information, and outputs the alert information.

5. A wireless communication system, comprising:
    a pair of wireless communication devices which are installed to face each other,
    wherein each of the wireless communication devices performs wireless communication with a counterpart device using a directional antenna, comprising
    an imaging unit that has an optical axis which is identical to a radio wave direction of the directional antenna, and photographs images of regions corresponding to the counterpart device serving as a monitoring target;
a storage unit that stores a reference image serving as a reference which is photographed by the imaging unit; and
a control unit that performs a communication failure prediction process of acquiring a photographed image photographed by the imaging unit at regular intervals, calculating a degree of similarity between the photographed image and the reference image for each of the regions serving as the monitoring target through normalized cross-correlation, calculating an index value representing a state of the regions serving as the monitoring target based on degrees of similarity which is weighted, detecting an abnormality when the index value is a specific numerical value or less, and outputting alert information including the photographed image when a state in which the abnormality is detected is continued for a certain period of time;
wherein the control unit sets a monitoring region including the counterpart device and a plurality of divisional blocks obtained by dividing an extended region obtained by extending the monitoring region as the region serving as the monitoring target, and in the communication failure prediction process, the control units calculates the degree of similarity between the photographed image and the reference image for the monitoring region and the plurality of divisional blocks, calculates an integrated index value in which the degrees of similarity of the monitoring region and the plurality of divisional blocks are integrated as the index value indicating the state of the region serving as the monitoring target, and detects the abnormality when the integrated index value is a threshold value which is set in advance or less.

6. The wireless communication system according to claim 5,
wherein, when the abnormality is detected in the communication failure prediction process, the control unit of the wireless communication device acquires a processing result of the communication failure prediction process in the counterpart device, adds a processing result in the wireless communication device to the processing result in the counterpart device, and estimates the cause of abnormality.

\* \* \* \* \*